(12) United States Patent
Kliskey

(10) Patent No.: US 7,458,298 B2
(45) Date of Patent: Dec. 2, 2008

(54) DRUM BRAKE IMPLEMENT

(75) Inventor: Roger Kliskey, Brimfield, OH (US)

(73) Assignee: Mayhew Steel Products, Inc., Turners Falls, MA (US)

( * ) Notice: Subject to any disclaimer, the term of this patent is extended or adjusted under 35 U.S.C. 154(b) by 248 days.

(21) Appl. No.: 11/356,132

(22) Filed: Feb. 16, 2006

(65) Prior Publication Data

US 2007/0187121 A1    Aug. 16, 2007

(51) Int. Cl.
*B25B 25/00*    (2006.01)
*B23P 19/04*    (2006.01)

(52) U.S. Cl. ............................... 81/486; 29/225; 7/100; 7/168

(58) Field of Classification Search .................. 81/486; 29/225, 227; 7/100, 138, 168, 170; 224/268, 224/269, 904
See application file for complete search history.

(56) References Cited

U.S. PATENT DOCUMENTS 2,578,983 A * 12/1951 Primak ........................ 30/432
2,804,887 A *  9/1957 Reck .......................... 140/123
5,619,774 A *  4/1997 Perry .......................... 24/3.6

OTHER PUBLICATIONS

Oldforge A Ken-Tool Company, Catalog No. 0602, p. 15, undated.

* cited by examiner

*Primary Examiner*—D. S Meislin
(74) *Attorney, Agent, or Firm*—Renner, Kenner, Greive, Bobak, Taylor & Weber

(57) ABSTRACT

An implement including a first tool having a first tool end in the form of a pig tail. The first tool includes an inwardly extending tab. A second tool is adjacent the first tool and has a second tool end adapted to receive a pin and includes a curved finger carried by the second tool end. A third tool is adjacent the second tool and has a third tool end which includes a sliding surface. A fourth tool is adjacent the third tool and has a fourth tool end which provides a ribbed interior surface adapted to engage a cap. Each tool is pivotally connected to a cylindrical retaining means, the tab selectively engaging the third tool, wherein when the tab engages the third tool, relative rotation is prevented.

28 Claims, 3 Drawing Sheets

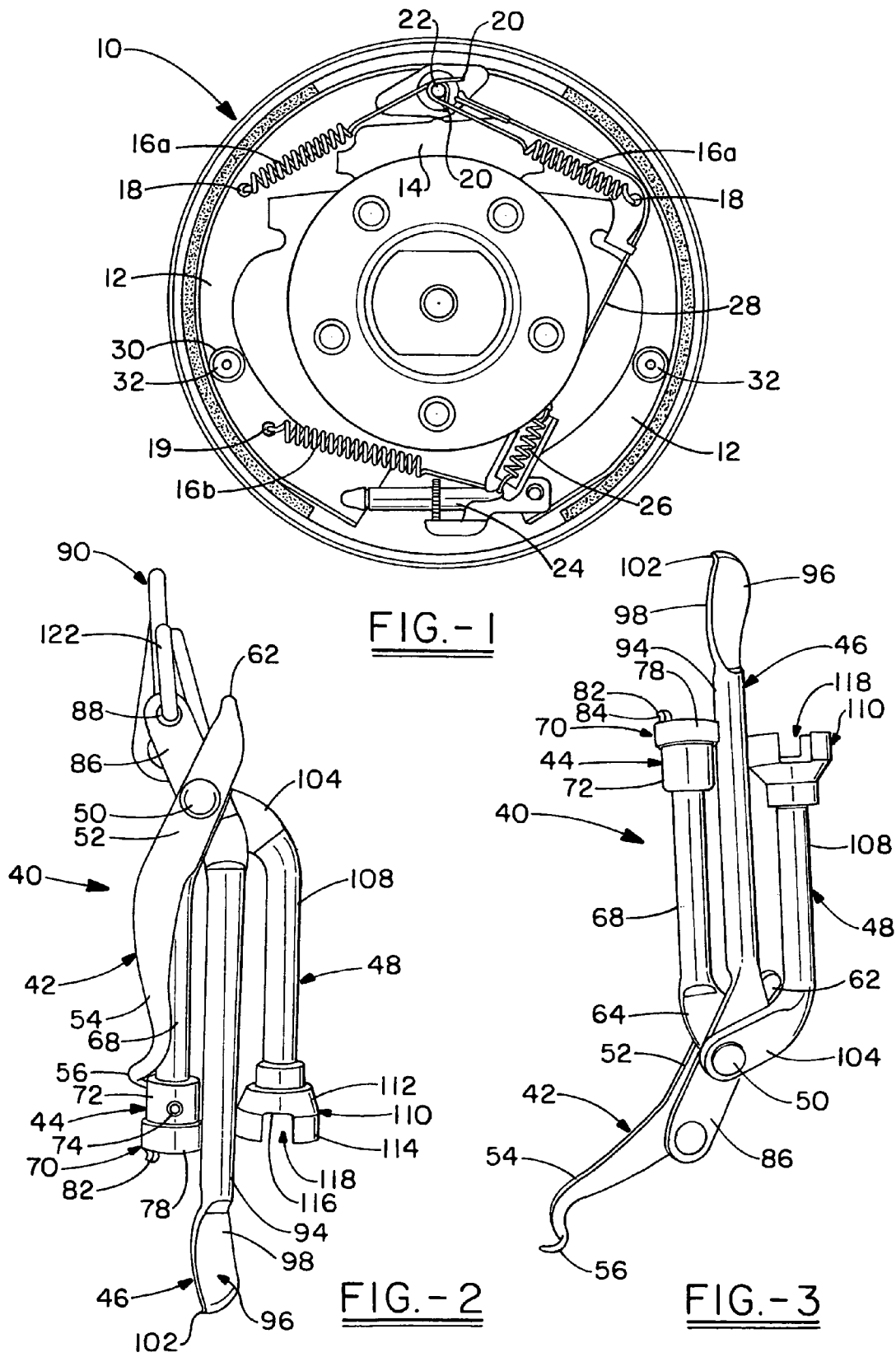

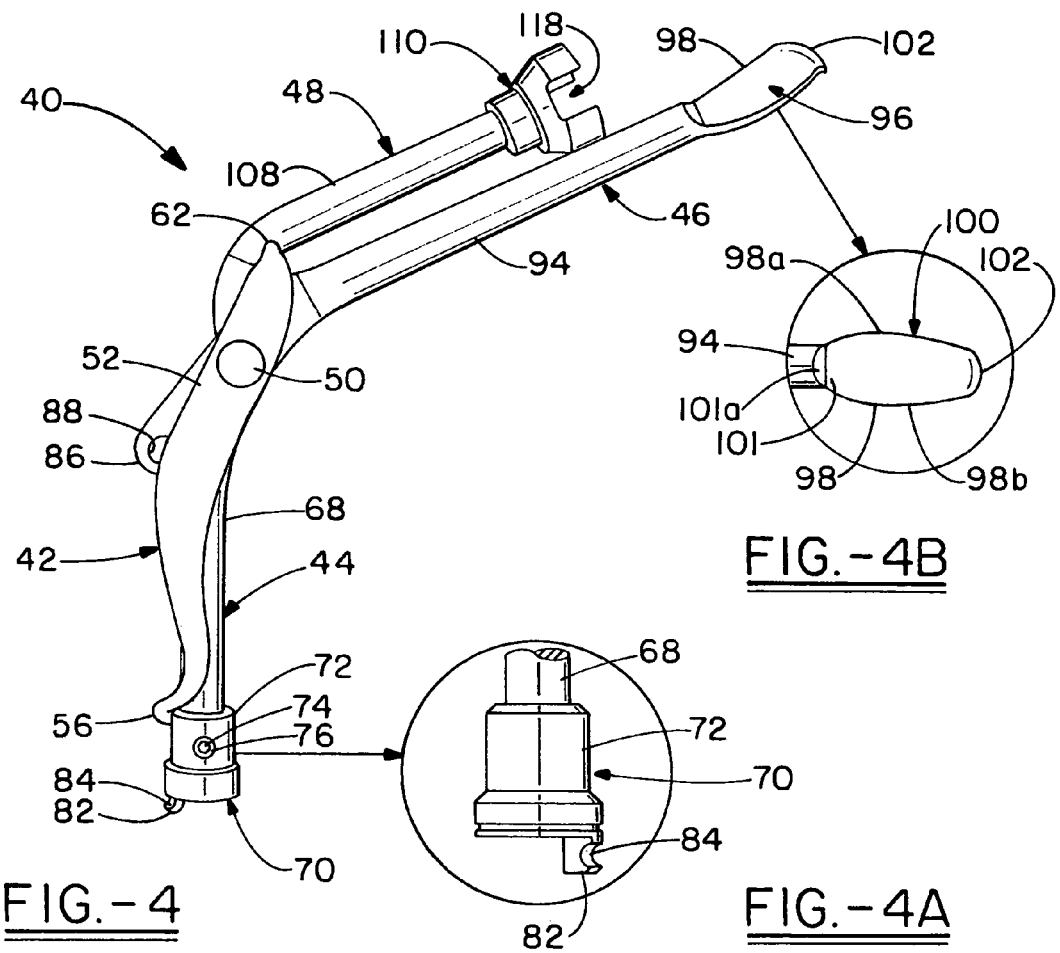
FIG.-4
FIG.-4A
FIG.-4B
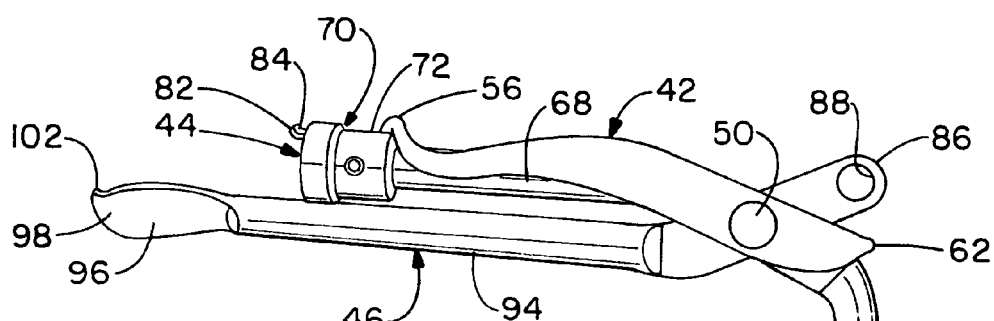
FIG.-5
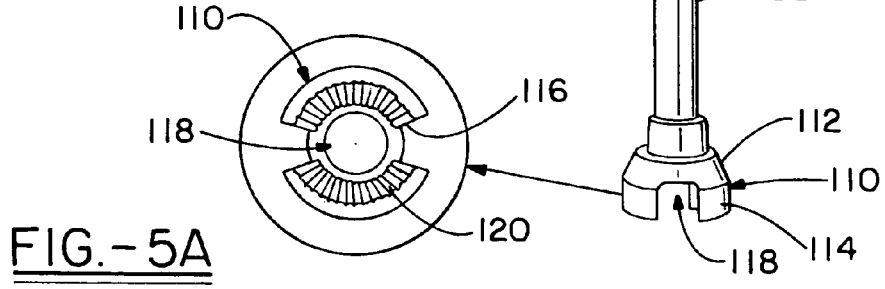
FIG.-5A

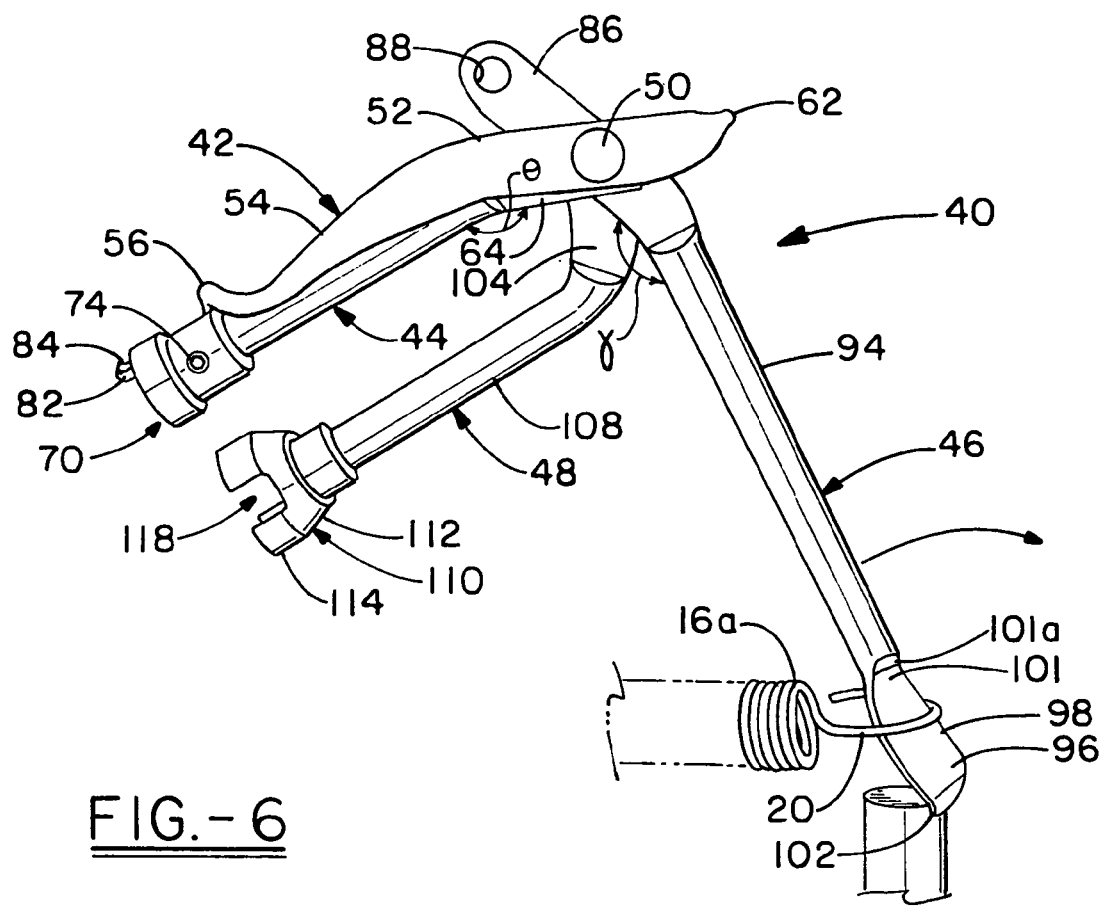
FIG.-6
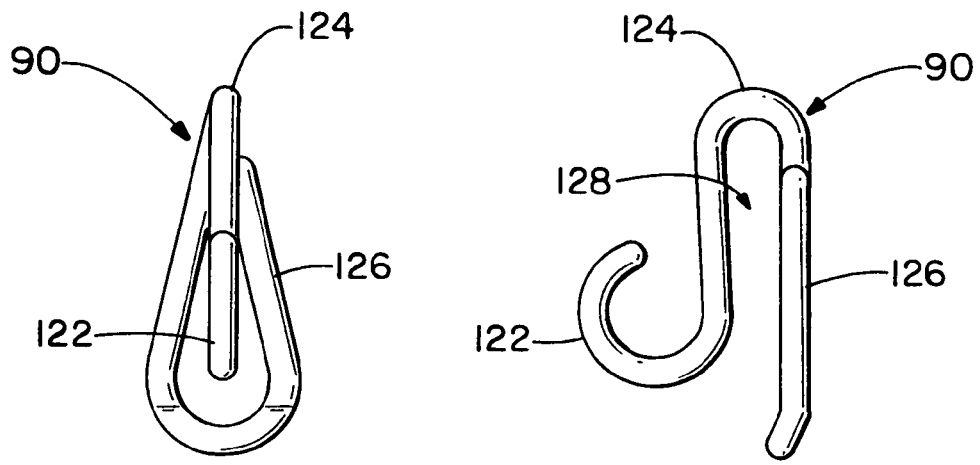
FIG.-7
FIG.-8

DRUM BRAKE IMPLEMENT

TECHNICAL FIELD

The present invention generally relates to a mechanic's implement used in the assembly and disassembly of drum brakes. More particularly, this invention relates to an implement which incorporates all of the tools necessary for drum brake maintenance in a single pivoting assembly.

BACKGROUND OF THE INVENTION

The installation and removal of vehicle drum brakes is oftentimes difficult and time consuming. Unlike the more simple disc brakes, drum brakes employ a complicated set of springs and retaining pins to hold together and bias the brake components. Referring to FIG. 1, an exemplary drum brake assembly 10 is disclosed. The drum brake assembly 10 includes a pair of opposed shoes 12 which are generally crescent shaped and pivotally secured to a backing plate 14. A braking force is applied when shoes 12 are forced outward and engage the interior of a rotatable drum. A number of springs 16, also referred to as return or retracting springs 16a or adjustor springs 16b, are provided which bias the brake assembly towards an unactuated state. In other words, springs 16 bias the shoes inward and away from the drum. The shoes 12 are provided with holes 18 which receive a hook 20 of return springs 16a. The upper two return springs 16a are thus coupled to the shoe 12 at holes 18 and the opposed end couples to a pin 22. The bottom adjustor spring 16b interconnects between the shoes 12, and thus each hook is received in a respective hole 19 on opposed shoes 12. An adjustor 24 may be provided to maintain a constant clearance between the brake shoes and the drum as the shoes wear. Various adjustors are used including rods, cables, and springs. In the example shown, the adjustor 24 is operatively connected to an adjustor spring 26 and cable 28, which in turn are coupled to pin 22.

A pair of retaining springs 30, also referred to as "hold down" springs, are carried by a projection (not shown) and maintained under compression by a cap 32, as is known in the art. In this manner, retaining springs 30 bias shoes 12 towards backing plate 14.

Replacement of shoes 12 requires a number of steps to remove the numerous springs. Additionally, different tools are necessary to remove each spring, depending upon orientation and the type of connection. Still further, reassembly of the springs after shoe replacement requires still additional tools. This is made even more complicated due to the difficulty of working with springs under tension or compression. A mechanic is constantly reaching for different tools while attempting to assemble or disassemble the brake.

Thus, there exists a need in the art for a single implement which carries all the tools a mechanic might need while servicing a drum brake. Additionally, there exists a need in the art for an implement which easily and quickly provides the appropriate tool to a mechanic with minimal effort.

SUMMARY OF THE INVENTION

The present invention generally provides a brake maintenance implement including, a first tool having a first tool end which is spiral shaped, a second tool having a second tool end adapted to receive a pin and including a curved outwardly extending finger, a third tool having a third tool end which includes a sliding surface which terminates at a downwardly curving lip, and a fourth tool having a fourth tool end which provides an interior surface adapted to receive a cap, wherein the tools are secured in a stacked orientation and each tool being pivotally connected to a retainer.

The present invention further provides, an implement including a first tool having a first tool end in the form of a pig tail, the first tool including an inwardly extending tab, a second tool adjacent the first tool and having a second tool end adapted to receive a pin and including a curved finger carried by the second tool end, a third tool adjacent the second tool and having a third tool end which includes a sliding surface, and a fourth tool adjacent the third tool and having a fourth tool end which provides a ribbed interior surface adapted to engage a cap, wherein each tool being pivotally connected to a retainer, the tab selectively engages the third tool, wherein when the tab engages the third tool, relative rotation is prevented.

The present invention still further provides, an implement including, a pig tail tool having an inwardly extending tab, a socket tool adjacent the pig tail tool, a return spring installer tool adjacent the socket tool, a retainer spring tool adjacent the return spring installer tool, and a retainer pivotally connecting the pig tail, socket tool, return spring installer tool and retainer spring tool, wherein the tab on the pig tail tool selectively engages the return spring installer tool to limit rotation of the return spring installer tool relative to the pig tail tool.

DESCRIPTION OF THE DRAWINGS

FIG. 1 is an end elevational view of a drum brake assembly;

FIG. 2 is a side view of a brake maintenance implement according to the concepts of the present invention;

FIG. 3 is a side view, as in FIG. 1, of the implement with the first tool rotationally pivoted away from second, third, and fourth tool;

FIG. 4 is a side view of the implement with the first and second tool rotationally pivoted away from the third and fourth tool;

FIG. 4a is an enlarged side elevational view showing details of the second tool end;

FIG. 4b is an enlarged elevational view showing details of the third tool end.

FIG. 5 is a side view of the implement with the fourth tool rotationally pivoted away from the first, second and third tool;

FIG. 5a is an enlarged end elevational view showing details of the fourth tool end;

FIG. 6 is a side view of the of the implement with the third tool and fourth tool rotationally pivoted away from the first, second tool;

FIG. 7 is a front view of the implement fastener of the present invention;

FIG. 8 is a side view of the implement fastener.

Preferred Embodiment of the Invention

With reference to FIGS. 1-8, a preferred drum brake maintenance implement according to this invention is shown and designated generally by the numeral 40. Implement 40 generally includes a first tool 42, second tool 44, third tool 46 and fourth tool 48 which are coupled together via a retainer 50. Retainer 50 may allow for rotation of the tools relative to each other so that each tool may be separated from the others and placed in an operating position. To that end, retainer 50 may act as a pivot and be in the form of a pin, bolt, rivet or other structure that joins the tools yet allows them to rotate.

With reference to FIGS. 2-3, first tool 42, which may be referred to as a "pig tail tool", includes a body portion 52. To reduce the bulk of implement 40, body portion 52 may be made flat. Body portion 52 terminates at a tapered portion 54, which may be disposed at an angle relative to body portion 52. Tapered portion 54 transitions to a first tool end 56 which is a spiral, coil-shaped member. First tool end 56 may be referred to as a "pig tail" as is known in the art, and is adapted to release and reinstall adjustor springs 16b, as will be described below.

Body portion 52 further includes an aperture (not shown) which is adapted to receive retainer 50. The aperture and retainer 50 are sized to allow rotation of first tool 42 about retainer 50. A tab 62 is positioned opposite tapered portion 54 and projecting inward from body portion 52, towards second tool 44. Tab 62 is adapted to contact a portion of third tool 46 and thus control relative rotational movement, as will be described later in more detail.

Second tool 44, which may be also referred to as a "Bendix socket tool" or a "socket tool", is positioned proximate to first tool 42 and includes a body portion 64 which may be flat. Body portion 64 is provided with an aperture (not shown) proximate to one end, which is adapted to receive retainer 50 therethrough. The second tool aperture is sized to allow second tool 44 to rotate about retainer 50. A shaft 68 projects from one end of body portion 64. Shaft 68 is disposed at an angle θ relative to body portion 64. In one or more embodiments, angle θ is less than 180 degrees and, as shown in FIG. 3 may be about 165 degrees. Shaft 68 may be generally cylindrical and terminates at a second tool end 70. Second tool end 70 includes a cylindrical body portion 72 having a diameter which is relatively larger than that of the shaft 68. Body portion 72 may include a threaded hole 74 which projects radially inward and is adapted to receive a set screw 76 therein. Set screw 76 may hold second tool end 70 securely to shaft 68. To that end, shaft 68 may include a groove or hole (not shown) which receives screw 76 therein. In this manner, the second tool end 70 may be secured to the shaft 68. It will be appreciated that second tool end 70 may be attached in any manner or formed integrally with shaft 68, as well. For example, second tool end 70 (as well as fourth tool end 110 as described below) may be threaded directly onto the shaft, attached with a set screw, press fit, staked, welded, or drilled through and split-pinned.

Second tool end 70 may further include a lip 78 which extends circumferentially from cylindrical body portion 72. The lip 78 and body portion 72 define a void 79 which is adapted to receive pin 22, as will be described below. A finger 82 projects from lip 78 and provides a curved C-shaped spring receiving surface 84. Tool end 70 may be referred to as a "Bendix socket" herein.

Third tool 46, which may be referred to as a "return spring installer tool", generally includes body portion 86 which may be made generally flat, as shown in the depicted example. Body portion 86 may be provided with an aperture (not shown) which is adapted to receive retainer 50 therethrough. In this manner, third tool 46 is rotatable about retainer 50. Proximate to one end of body portion 86, a hole 88 may be provided that is adapted to receive a portion of a fastener 90. Opposite hole 88, a shaft 94 projects from body portion 86. Shaft 94 may be disposed at an angle relative to body portion 86 and terminates at a third tool end 96. In one or more embodiments, the shaft angle γ is less than 180 degrees, and may, as shown in FIG. 6, be about 165 degrees. Third tool end 96 is adapted to simplify spring mounting and is thus provided with a convex sliding surface 98 over which the end of the retaining spring is hooked. As best shown in FIG. 4B, convex sliding surface 98 includes a pair of sidewalls 98a, 98b that extend axially outward from the shaft 94 and are arranged in a hooded configuration such that a cavity 99 is formed beneath the convex sliding surface 98. The sidewalls may extend generally parallel to each other, allowing the hooked end 20 of retaining spring 16a to slide freely off of the tool end 90 when it is tipped downward, as shown in FIG. 6. Or, as shown in FIG. 4B, a convex sliding surface 98 having a non-constant cross-section may be used. For example, a wider portion, generally indicated by the number 100, may be formed by increasing the space between sidewalls 98a, 98b. In the example shown, wide portion 100 is located axially outward of the portion 101 of the tool end 96 located adjacent to the shaft 94, such that in preparing to mount the spring 16a, the hook portion 20 may be located on portion 101 adjacent to the shaft 94. As shown in FIG. 6, portion 101 adjacent to the shaft 94 may be necked downward relative to shaft 94 forming a recess 101a in which the hook portion 20 is initially received. In this way, the non-linearity between shaft 94 and portion 101 prevents the hook portion 90 from sliding upward onto shaft 94 as the tool end 90 is tipped. Release of the hook portion 20 may be made in a controlled fashion by steadily increasing the angle of the tool end 96 relative to the pin on which the spring is being mounted. Third tool end 96 terminates at a downwardly curving lip 102 which promotes stable contact with pin 22. Curving lip 102 may extend downwardly beyond the convex sliding surface 98 to form a downwardly extending projection 103 that may be used for increased leverage as the tool is rotated upward to mount the spring 16a.

With reference to FIG. 5, fourth tool 48, which may be referred to as a "retainer spring tool," includes a body portion 104 which may be generally flat. Body portion 104 is provided with an aperture (not shown) proximate to one end which is adapted to receive retainer 50 therethrough. In this manner, fourth tool 48 is rotatable about retainer 50. A shaft 108 projects from body portion 104 and is disposed at an angle ω relative thereto. In general, angle ω is oblique and, as shown, may be obtuse. In one or more embodiments, the shaft angle is at least about 90 degrees. Shaft 108 terminates at a fourth tool end 110. Fourth tool end 110 may be attached to shaft 108 or integrally formed therewith in the same manner as second tool end 70. Fourth tool end 110 includes a body portion 112 and an outer lip 114. Outer lip 114 is interrupted by a pair of notches 116 which separate outer lip 114 into two sections. Outer lip 114 and body portion 104 define an interior surface 118 which is adapted to engage cap 32. To that end, a plurality of ribs 120 may be provided to help grip cap 32. In use, the slotted cap 32 is pushed to compress retaining spring 30, and then twisted to allow the flat end of the pin to clear, releasing the retaining spring 30.

Thus, in this manner, a set of four tools are pivotally coupled to a single retainer and moveable so that each tool may be independently placed in an operating position. Further, the relative orientations of each tool with respect to each other is controlled so that convenient operating positions are obtained. As shown in FIGS. 2, 5 and 6, the first tool end 56 is adapted to contact the shaft 68 or second tool end 70. Thus, as shown in FIG. 1, in order for second tool 44 to rotate clockwise about retainer 50, first tool 42 must rotate along with it. Further, as seen in FIG. 3, the tab 62 of first tool 42 projects inward and is positioned to selectively contact the body portion 86 of third tool 46. Thus, tab 62 forms the open L-shaped configuration shown in FIGS. 3 and 4, and first tool 42 may be rotated to third tool 46. Further rotation is prevented when tab 62 contacts the body portion 86 of third tool 46. In this way, the tools that are in non-operating position form a stable grip for the mechanic.

To conveniently hold the implement 40, a fastener 90 may be provided to attach the implement 40 to the mechanic's belt or other convenient support. With reference to FIGS. 7 and 8, fastener 90 may be a single uninterrupted metal or plastic piece having a generally J-shaped hook 122 which is optionally received in hole 88 of third tool 46. A U-shaped section 124 joins hook 122 to form a generally teardrop-shaped body portion 126. Hook 122, U-shaped section 124 and body portion 126 define a channel 128 which may receive a belt or other object therein. In this manner, fastener 90 may be secured to a belt or other object and in turn receive the brake repair implement 40 on hook 122.

The method of use of the drum brake repair implement 40 will now be described. First, the second tool 44 is placed into an operating position. This is accomplished by rotating the first and second tools 42 and 44 relative to third and fourth tools 46 and 48. The resulting orientation is shown in FIG. 4. As noted earlier, implement 40 is retained in the open L-shaped orientation and prevented from further rotation because tab 62 of first tool 42 contacts body portion 86 of third tool 46. The first tool end 56 in turn prevents further rotation of second tool 44 beyond first tool 42. In this orientation, it should be appreciated that shaft 94 and shaft 108 act as a convenient gripping handle for a mechanic.

The mechanic may thus grip third and fourth tools 46 and 48 with one or both hands. The second tool end 70 may then be placed over pin 22 with the finger 82 indexed so that it faces towards the body of spring 16a. In this manner, the pin 22 is received in the void. The mechanic may then rotate the second tool end 70 so that the hook portion 20 of spring 16a is received on spring receiving surface 84. Once the second tool end 70 is rotated about 180 degrees, the hook portion 20 is fully received on finger 82, and the mechanic simply pulls the second tool end 70 upward and away from pin 22. In this manner, spring 16a is easily removed. The process may then be repeated with second spring 16a coupled to pin 22.

Next, the adjustor spring 26 and cable 28 may be removed, which fully exposes the bottom adjustor spring 16b. The first tool 42 is then placed in an operating position. This is accomplished by rotating first tool 42 away from second, third and fourth tool 44, 46 and 48, resulting in the orientation shown in FIG. 3. As noted earlier, the implement is retained in the open L-shaped orientation. The mechanic may then grip the implement 40 at second, third and fourth tools 44, 46 and 48 with one or both hands. First tool end 56 is then used, as known in the art, to remove the bottom spring 16b from holes 19 in shoes 12.

Finally, the retaining springs 30 may be removed. This may be accomplished by the fourth tool. This fourth tool is placed in an operating position. The fourth tool 48 is rotated away from first, second and third tools 42, 44 and 46, resulting in the orientation displayed in FIG. 5. The mechanic may then grip the implement 40 at first, second and third tools 42, 44 and 46 with one or both hands. The fourth tool end 110 is then positioned over cap 32, and an inward and twisting motion frees the cap 32 from the pin, as is known in the art. Thus removed, the retaining spring 30 is released, and the shoes 12 may likewise be removed and replaced.

Reassembly of the brake components is performed with implement 40 in the following manner. The retaining springs 30 are placed over the pins, and the cap 32 is positioned over the springs 30. The fourth tool 48 is placed in an operating position by rotating it away from first, second and third tools 42, 44 and 46, resulting in the orientation displayed in FIG. 5. The mechanic may then grip the implement 40 at first, second and third tools 42, 44 and 46 with one or both hands. The fourth tool end 110 is then positioned over cap 32, and an inward and twisting motion reattaches the cap 32 to the projection in a manner known in the art.

Next, the bottom adjustor spring 16b is reattached to shoes 12 in the following manner. The first tool 42 is placed in an operating position. This is accomplished by rotating first tool 42 away from second, third and fourth tool 44, 46 and 48, resulting in the orientation shown in FIG. 3. The mechanic may then grip the implement 40 at second, third and fourth tools 44, 46 and 48 with one or both hands. First tool end 56 is then used, as known in the art, to place the hook portions 20 of bottom spring 16b into holes 18 on the shoes. The adjustor spring 26 and cable 28 may then be reattached.

Finally, the top retracting springs 16a are reattached to the shoe 12 and pin 22 in the following manner. Third tool 46 is placed in an operating position. This is accomplished by rotating third tool 46 away from first, second and fourth tools 42, 44 and 48, resulting in the orientation shown in FIG. 6. Alternatively, since the L-shaped configuration, which facilitates twisting of the tool, is not needed during the third tool's operation, the third tool 46 may be used with all of the other tools rotated to a closed position (FIG. 2). Once hook 20 of spring 16a is placed in a shoe hole 18, and the opposed hook 20 is placed over sliding surface 98 at 101. The downwardly curving lip 102 is then placed on pin 22. Thus positioned, third tool 46 is pivoted about pin 22 in the direction D. As third tool 46 passes through perpendicular with pin 22, the hook portion 20 of spring 16a will slide along sliding surface 98 and onto pin 22. This process is likewise repeated with the second upper return spring 16a.

In light of the foregoing, it should be apparent that the present invention provides a brake repair implement that substantially advances the art. While only particularly preferred embodiments have been disclosed herein, this invention is not limited to or by any specific recitation of the elements of these embodiments and their interrelation. The scope of this invention is limited only by the claims that follow.

What is claimed is:

1. A brake maintenance implement comprising:

a retainer;

a first tool having a first tool end which is spiral shaped;

a second tool having a second tool end adapted to receive a pin and including a curved outwardly extending finger;

a third tool having a third tool end, said third tool end including a sliding surface, said sliding surface terminating in a downwardly curving lip;

a fourth tool having a fourth tool end which provides an interior surface adapted to receive a cap; and wherein said tools are secured in a stacked orientation and each said tool being pivotally connected by said retainer, and wherein one of said first tool, second tool, third tool and fourth tool includes an inwardly projecting tab, said tab being adapted to selectively contact at least one of said other tools, whereby said tab limits rotation of said tool including said tab relative to at least one of said other tools.

2. The brake maintenance implement of claim 1, wherein each said tool includes a flat body portion, and wherein said retainer connects each of said tools at said body portion.

3. The brake maintenance implement of claim 1, wherein said retainer is a bolt.

4. The brake maintenance implement of claim 1, wherein said first tool end is adapted to selectively contact said second tool, preventing relative rotation of said first tool beyond said second tool.

5. The brake maintenance implement of claim 2, wherein said first tool further includes a taper portion which projects at an angle from said body portion at one end and transitions to said first tool end at a second end.

6. The brake maintenance implement of claim 2, wherein said second tool includes a shaft which projects from said second tool body portion at an oblique angle, said shaft carrying said second tool end.

7. The brake maintenance implement of claim 1, wherein said second tool end includes a cylindrical body portion and a circumferential lip, said circumferential lip extending from said cylindrical body portion and carrying said finger.

8. The brake maintenance implement of claim 6, wherein said finger includes a C-shaped surface adapted to receive a spring.

9. The brake maintenance implement of claim 2, wherein said third tool includes a shaft which projects from said third tool body portion at an angle, said shaft carrying said third tool end.

10. The brake maintenance implement of claim 1, wherein said third tool includes a shaft on which said tool end is mounted, and wherein said tool end necks downward at a portion adjacent to said shaft.

11. The brake maintenance implement of claim 2, wherein said fourth tool includes a shaft which projects from said fourth tool body at an angle, said shaft carrying said fourth tool end.

12. The brake maintenance implement of claim 1, wherein said fourth tool end includes a body portion and a pair of outer lips, said body portion carrying said outer lips, said outer lips being separated by a pair of grooves and said body portion and outer lip defining said interior surface which is provided with a plurality of ribs.

13. The brake maintenance implement of claim 1, further comprising a fastener, said third tool including a hole, wherein a portion of said fastener is received in said hole.

14. The brake maintenance implement of claim 13, wherein said fastener includes a J-shaped hook, a tear-shaped body portion and a U-shaped portion, said U-shaped portion interconnecting said hook portion with said body portion, said U-shaped portion, said J-shaped hook and said body portion forming a channel which may receive an object therein.

15. The brake maintenance implement of claim 14, wherein said J-shaped hook is received in said hole, thereby fastening said third tool to the object.

16. An implement comprising:
a first tool having a first tool end in the form of a pig tail, said first tool including an inwardly extending tab;
a second tool adjacent said first tool and having a second tool end adapted to receive a pin and including a curved finger carried by said second tool end;
a third tool adjacent said second tool and having a third tool end which includes a sliding surface;
a fourth tool adjacent said third tool and having a fourth tool end which provides a ribbed interior surface adapted to engage a cap; and
a retainer pivotally connecting said first, second, third and fourth tools, wherein said tab on said first tool selectively engages said third tool to limit rotation of said first tool relative to said third tool.

17. The implement of claim 16, wherein each said tool includes a flat body portion, each said body portion including an aperture which receives said retaining means.

18. The implement of claim 16, wherein said retaining means is a bolt.

19. The implement of claim 16, wherein said first tool end is adapted to selectively contact said second tool, preventing relative rotation of said first tool beyond said second tool.

20. The implement of claim 17, wherein said first tool further includes a taper portion which projects at an angle from said body portion at one end and transitions to said first tool end at the opposed end.

21. The implement of claim 17, wherein said second tool includes a shaft which projects from said second tool body portion at an angle, said shaft carrying said second tool end.

22. The brake maintenance implement of claim 16, wherein said second tool end includes a cylindrical body portion and a circumferential lip, said circumferential lip extending from said cylindrical body portion and carrying said finger.

23. The brake maintenance implement of claim 22, wherein said finger includes a C-shaped surface adapted to receive a spring.

24. The brake maintenance implement of claim 17, wherein said third tool includes a shaft which projects from said third tool body portion at an angle, said shaft carrying said third tool end.

25. The brake maintenance implement of claim 16, wherein said third tool includes a shaft on which said tool end is mounted, and wherein said tool end necks downward at a portion adjacent to said shaft.

26. The brake maintenance implement of claim 17, wherein said fourth tool includes a shaft which projects from said fourth tool body at an angle, said shaft carrying said fourth tool end.

27. The brake maintenance implement of claim 16, wherein said fourth tool end includes a body portion and a pair of outer lips, said body portion carrying said outer lips, said outer lips being separated by a pair of grooves and said body portion and said outer lips defining said interior surface which is provided with a plurality of ribs.

28. An implement comprising:
a pig tail tool having an inwardly extending tab;
a socket tool adjacent said pig tail tool;
a return spring installer tool adjacent said socket tool;
a retainer spring tool adjacent said return spring installer tool; and
a retainer pivotally connecting said pig tail tool, said socket tool, said return spring installer tool and said retainer spring tool, wherein said tab on said pig tail tool selectively engages said return spring installer tool to limit rotation of said pig tail tool relative to said spring installer tool.

* * * * *